(12) United States Patent
Ishikura et al.

(10) Patent No.: US 12,452,382 B2
(45) Date of Patent: Oct. 21, 2025

(54) INFORMATION PROCESSING APPARATUS, INFORMATION PROCESSING SYSTEM, METHOD FOR PROCESSING INFORMATION, AND NON-TRANSITORY RECORDING MEDIUM

(71) Applicants: Kazuki Ishikura, Kanagawa (JP); Tadaaki Oyama, Kanagawa (JP); Ayumu Hashimoto, Kanagawa (JP); Yuuki Nakada, Kanagawa (JP)

(72) Inventors: Kazuki Ishikura, Kanagawa (JP); Tadaaki Oyama, Kanagawa (JP); Ayumu Hashimoto, Kanagawa (JP); Yuuki Nakada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/228,685

(22) Filed: Aug. 1, 2023

(65) Prior Publication Data

US 2024/0056541 A1    Feb. 15, 2024

(30) Foreign Application Priority Data

Aug. 9, 2022   (JP) .................. 2022-127461

(51) Int. Cl.
*H04N 1/44* (2006.01)
*H04N 1/00* (2006.01)
*H04N 1/387* (2006.01)

(52) U.S. Cl.
CPC ......... *H04N 1/448* (2013.01); *H04N 1/00167* (2013.01); *H04N 1/3871* (2013.01)

(58) Field of Classification Search
CPC ... H04N 1/448; H04N 1/00167; H04N 1/3871
(Continued)

(56) References Cited

U.S. PATENT DOCUMENTS

| 10,279,583 B2 | 5/2019 | Delaney et al. |
| 2009/0080027 A1* | 3/2009 | Ugajin ............... H04N 1/32144 |
| | | 358/3.28 |

(Continued)

FOREIGN PATENT DOCUMENTS

| JP | 2006-146334 A | 6/2006 |
| JP | 2007-323139 A | 12/2007 |
| JP | 2020-028102 A | 2/2020 |

OTHER PUBLICATIONS

NPL: Results Publication Date Range: Feb. 17, 1998 to Feb. 22, 2024.*

(Continued)

*Primary Examiner* — Quang N Vo
(74) *Attorney, Agent, or Firm* — XSENSUS LLP

(57) ABSTRACT

An information processing apparatus includes circuitry. The circuitry transmits document data in response to a request signal transmitted from an information processing terminal and requesting output of the document data. Based on an information signal transmitted from the information processing terminal and indicating information that is not described in a document indicated by the document data, the circuitry generates latent-image data as a latent image including the information signal and the document data. The circuitry outputs the latent-image data and the document data.

7 Claims, 10 Drawing Sheets

(58) Field of Classification Search
USPC .......................................... 358/450, 1.9, 1.15
See application file for complete search history.

(56) References Cited

U.S. PATENT DOCUMENTS

| | | | |
|---|---|---|---|
| 2010/0128320 A1 | 5/2010 | Fan et al. | |
| 2010/0195834 A1* | 8/2010 | Amagai | H04N 1/32133 358/1.15 |
| 2011/0090520 A1* | 4/2011 | Yokoi | H04N 1/6019 358/1.9 |
| 2011/0090541 A1* | 4/2011 | Harper | G06V 40/13 715/705 |
| 2011/0164288 A1* | 7/2011 | Ono | H04N 1/00843 358/3.28 |
| 2012/0033254 A1* | 2/2012 | Numata | G06F 3/1213 358/1.15 |
| 2012/0147425 A1* | 6/2012 | Kamiya | G06F 21/6209 358/1.15 |
| 2013/0003087 A1* | 1/2013 | Kuo | G06K 15/1802 358/1.9 |
| 2013/0057880 A1* | 3/2013 | Yokoi | H04N 1/60 358/1.9 |
| 2013/0250366 A1* | 9/2013 | Kinoshita | G06K 15/1892 358/3.28 |
| 2013/0265617 A1* | 10/2013 | Murakami | G07D 7/121 358/448 |
| 2015/0043021 A1* | 2/2015 | Ikeda | H04N 1/32561 358/1.13 |
| 2017/0264782 A1 | 9/2017 | Hashimoto | |
| 2020/0053230 A1 | 2/2020 | Nakazawa et al. | |
| 2023/0148080 A1* | 5/2023 | Sakurada | H04N 1/00474 358/3.28 |

OTHER PUBLICATIONS

Ei-Ju Chiang et al: "Extrinsic Signature Embedding and Detection in Electrophotographic Halftoned Images Through Exposure Modulation", IEEE Transactions on Information Forensics and Security, IEEE, USA, vol. 6, No. 3, Sep. 1, 2011 (Sep. 1, 2011), pp. 946-959, XP011349896.
Extended European Search Report issued Dec. 12, 2023, in corresponding European Patent Application No. 23190010.1, 10 pages.

\* cited by examiner

FIG. 5
RELATED ART
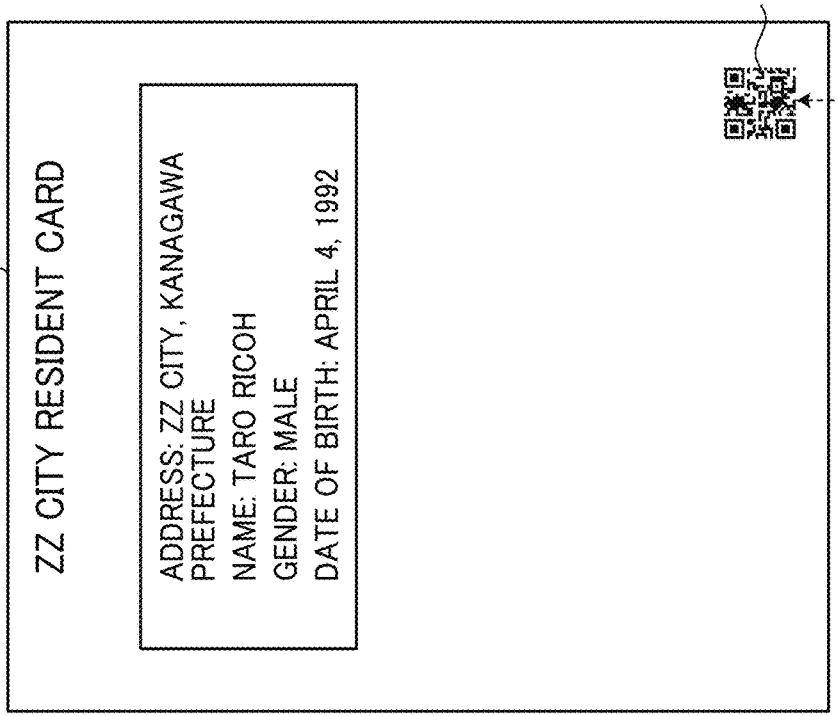
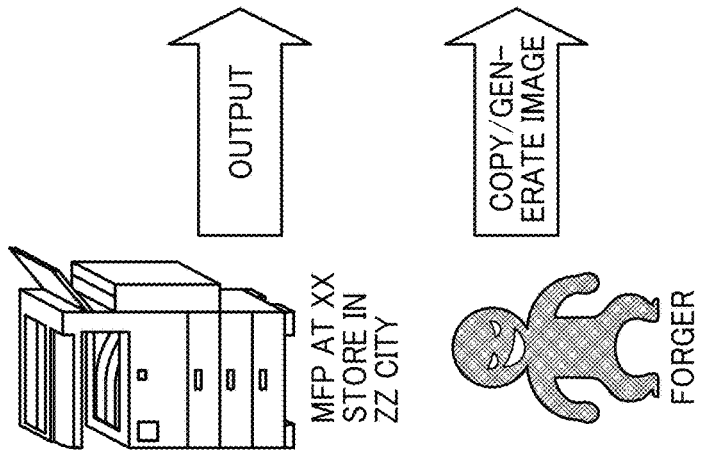

FIG. 7
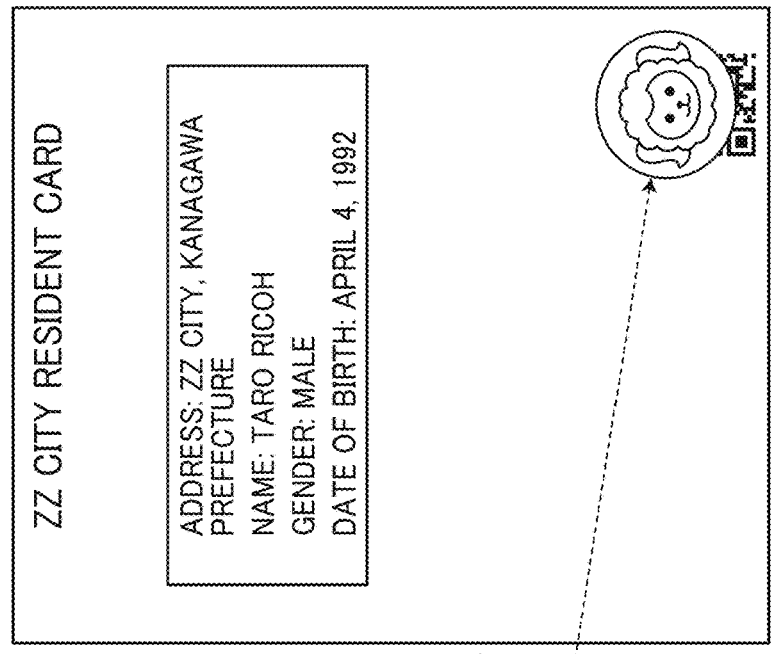
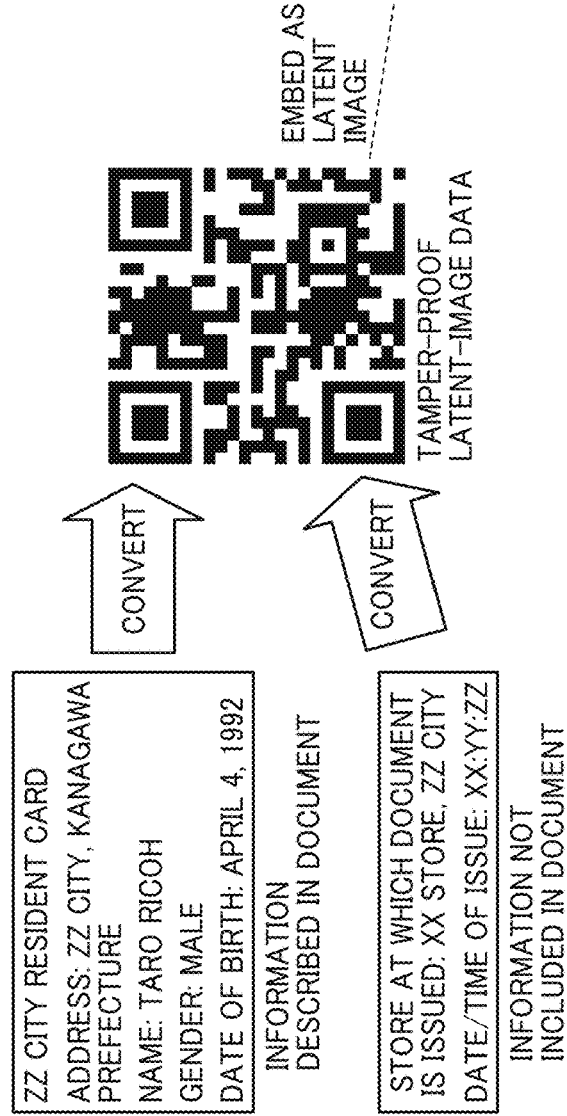

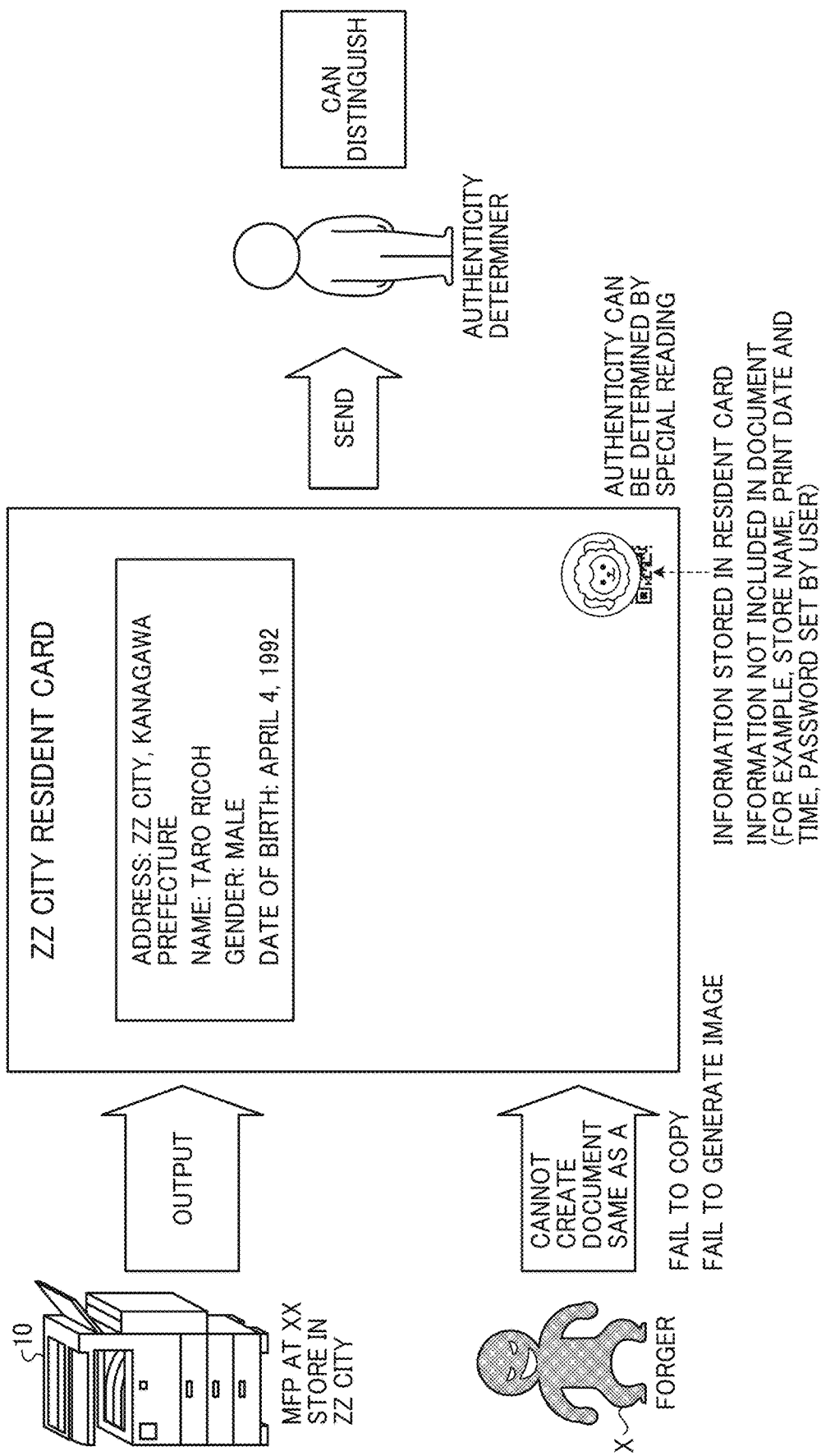

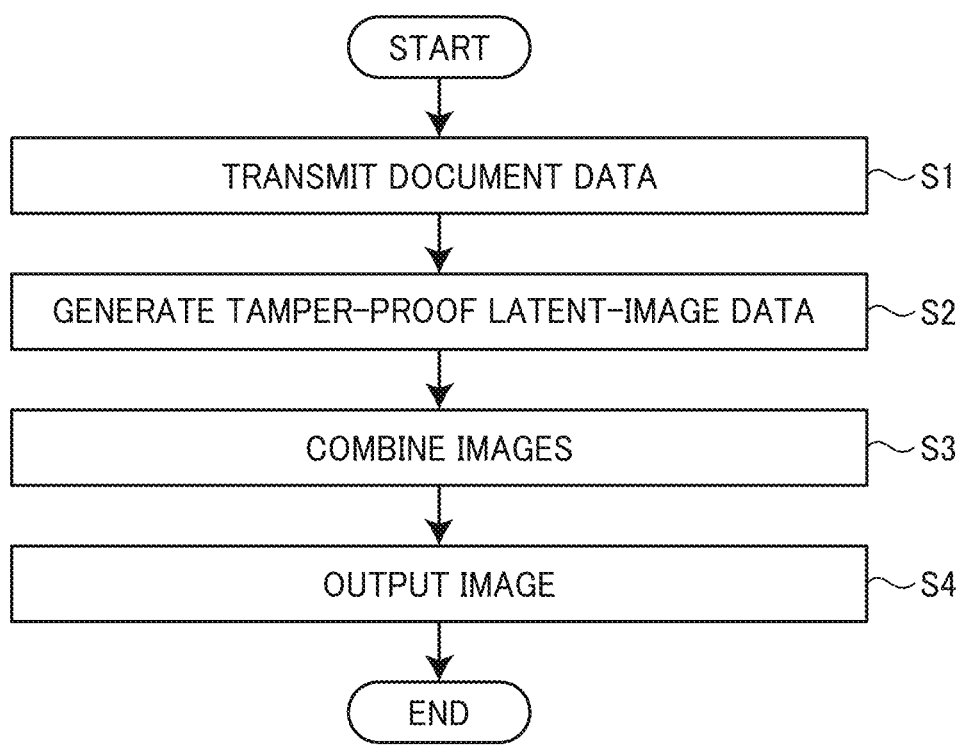

INFORMATION PROCESSING APPARATUS, INFORMATION PROCESSING SYSTEM, METHOD FOR PROCESSING INFORMATION, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2022-127461, filed on Aug. 9, 2022, in the Japan Patent Office, the entire disclosure of which is hereby incorporated by reference herein.

BACKGROUND

Technical Field

Embodiments of the present disclosure relate to an information processing apparatus, an information processing system, a method for processing information, and a non-transitory recording medium.

Related Art

As known in the art, some techniques have been proposed that prevent the falsification of documents.

SUMMARY

According to an embodiment of the present disclosure, an information processing apparatus includes circuitry. The circuitry transmits document data in response to a request signal transmitted from an information processing terminal and requesting output of the document data. Based on an information signal transmitted from the information processing terminal and indicating information that is not described in a document indicated by the document data, the circuitry generates latent-image data as a latent image including the information signal and the document data. The circuitry outputs the latent-image data and the document data.

According to an embodiment of the present disclosure, an information processing system includes an information processing terminal and the information processing apparatus communicably connected with the information processing terminal.

According to an embodiment of the present disclosure, a method for processing information includes transmitting document data in response to a request signal transmitted from an information processing terminal and requesting output of the document data, generating, based on an information signal transmitted from the information processing terminal and indicating information that is not described in a document indicated by the document data, latent-image data as a latent image including the information signal and the document data, and outputting the latent-image data and the document data.

According to an embodiment of the present disclosure, a non-transitory recording medium stores a plurality of instructions which, when executed by one or more processors, causes the processors to perform the method for processing information.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a diagram illustrating an unfavorable situation that occurs in the comparative example;

FIG. 7 is a diagram illustrating a composite image generated by a latent-image combining unit according to an embodiment of the present disclosure;

FIG. 9 is a diagram illustrating an effect that an image output from an image data output unit is not forged, according to an embodiment of the present disclosure; and FIG. 10 is a flowchart of an image data output process in a server according to an embodiment of the present disclosure.

Figure 1:
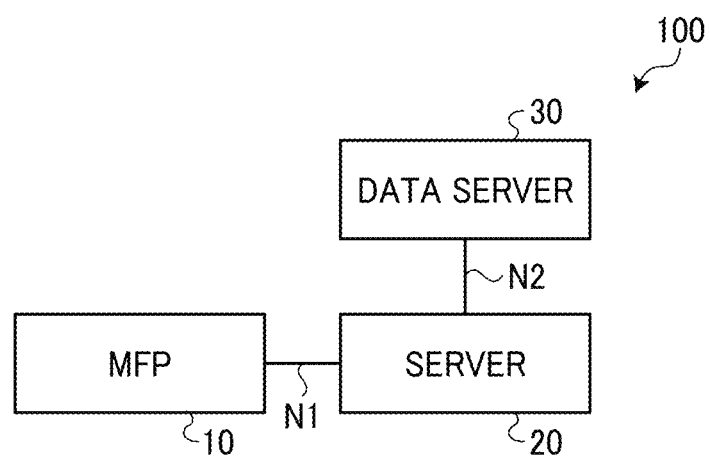
FIG. 1 is a block diagram illustrating a system configuration of an information processing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present disclosure are described below.

As used herein, the singular forms "a," "an," and "the" are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

As used herein, the term "connected/coupled" includes both direct connections and connections in which there are one or more intermediate connecting elements.

FIG. 1 is a block diagram illustrating a system configuration of an information processing system 100 according to an embodiment of the present disclosure.

As illustrated in FIG. 1, the information processing system 100 includes a multifunction peripheral (MFP) 10, which may be referred to as a multifunction product or printer, a server 20, and a data server 30. The MFP 10 is an information processing terminal disposed at, for example, a convenience store as a retail store. The server 20 is an information processing apparatus disposed at, for example, an information processing center connected through a network separately from the information processing terminal. The data server 30 is disposed at, for example, a local government such as an administrative agency connected through a network separately from the server 20.

The MFP 10 is a multifunction peripheral having at least two of copying, printing, scanning, and facsimile functions. The MFP 10 is connected to the server 20 through a network N1 such as the internet.

The data server 30 accumulates document data such as resident-card data. The data server 30 is connected to the server 20 through a network N2 such as the Internet.

The server 20 acquires document data from the server 30 in response to a request from the MFP 10. The server 20 performs given image processing on the document data acquired from the data server 30 to generate an image, and then outputs the image. The given image processing that is executed by the server 20 is processing for converting, into a latent image, a two-dimensional code that is based on the document data acquired from the data server 30. A detailed description of the given image processing that is executed by the server 20 is deferred. The latent image is an image formed to be invisible (or hardly visible) to the naked eyes by any method.

Firstly, a description is given of the hardware configuration of the MFP 10.

Figure 2:
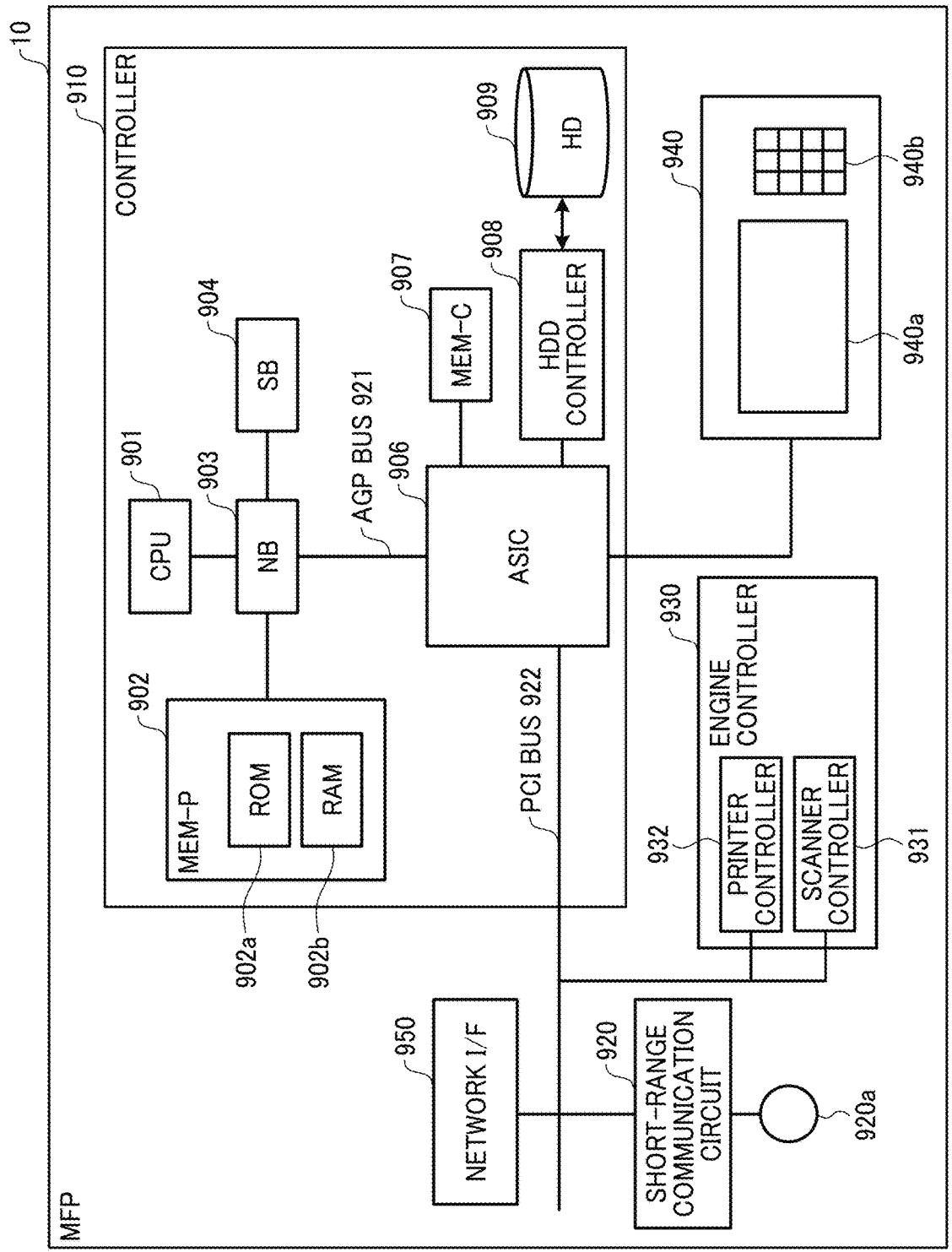
FIG. 2 is a block diagram illustrating a hardware configuration of a multifunction peripheral (MFP) according to an embodiment of the present disclosure.

FIG. 2 is a block diagram illustrating a hardware configuration of the MFP 10 according to the present embodiment.

As illustrated in FIG. 2, the MFP 10 includes a controller 910, a short-range communication circuit 920, an engine controller 930, a control panel 940, and a network interface (I/F) 950.

The controller 910 includes a central processing unit (CPU) 901 as a main processor of a computer, a system memory (MEM-P) 902, a north bridge (NB) 903, a south bridge (SB) 904, an application specific integrated circuit (ASIC) 906, a local memory (MEM-C) 907 as a storage device, a hard disk drive (HDD) controller 908, and a hard disk (HD) 909 as a storage device.

The NB 903 and the ASIC 906 are connected to each other via an accelerated graphics port (AGP) bus 921.

The CPU 901 controls the entire operation of the MFP 10. The NB 903 connects the CPU 901 to the MEM-P 902, the SB 904, and the AGP bus 921. The NB 903 includes a peripheral component interconnect (PCI) master, an AGP target, and a memory controller that controls the reading and writing of data from and to the MEM-P 902.

The MEM-P 902 includes a read-only memory (ROM) 902a and a random access memory (RAM) 902b. The ROM 902a stores data and programs for implementing various functions of the controller 910. The RAM 902b is used to load the programs and the data. For example, the RAM 902b is used as a drawing memory to store drawing data for printing. For distribution, the programs that are stored in the RAM 902b may be stored in a computer-readable recording medium in an installable or executable file format. Examples of the computer-readable recording medium include, but are not limited to, a compact disc read-only memory (CD-ROM), a compact disc-recordable (CD-R), and a digital versatile disc (DVD).

Alternatively, the programs that are executed by the MFP 10 of the present embodiment may be stored on a computer connected to a network such as the Internet so that the programs can be downloaded through the network and provided. Alternatively, the programs that are executed by the MFP 10 of the present embodiment may be provided or distributed through a network such as the Internet.

The SB 904 connects the NB 903 to a PCI device and a peripheral device. The ASIC 906 is an integrated circuit (IC) dedicated to image processing and includes hardware elements for image processing. The ASIC 906 serves as a bridge to connect the AGP bus 921, a PCI bus 922, the HDD controller 90g, and the MEM-C 907 to each other. The ASIC 906 includes a PCI target, an AGP master, an arbiter (ARB) as a central processor of the ASIC 906, a memory controller that controls the MEM-C 907, a plurality of direct memory access controllers (DMACs), and a PCI unit. For example, the DMACs convert coordinates of image data with a hardware logic to rotate an image based on the image data. The PCI unit transfers data between a scanner controller 931 and a printer controller 932 through the PCI bus 922. The ASIC 906 may be connected to a universal serial bus (USB) interface or an Institute of Electrical and Electronics Engineers 1394 (IEEE1394) interface.

The MEM-C 907 is a local memory that is used as a buffer for image data to be copied or a code buffer. The HD 909 is a storage device that accumulates image data, font data for printing, and form data. The HDD controller 908 controls the reading and writing of data from and to the HD 909 under the control of the CPU 901. The AGP bus 921 is a bus interface for a graphics accelerator card, which is proposed to accelerate graphics processing. Direct access to the MEM-P 902 by high-throughput can accelerate the graphics accelerator card.

The short-range communication circuit 920 is provided with a short-range communication antenna 920a. The short-range communication circuit 920 is a communication circuit in compliance with, for example, the near field communication (NFC) or BLUETOOTH.

The engine controller 930 includes the scanner controller 931 and the printer controller 932. The control panel 940 includes a panel display 940a and an operation device 940b. The panel display 940a is, for example, a touch panel that displays current settings or a selection screen and receives user input. The operation device 940b includes, for example, a numeric keypad and a start key. The numeric keypad receives assigned values of image forming parameters such as an image density parameter. The start key receives an instruction to start copying. The controller 910 controls the entire MFP 10. For example, the controller 910 controls drawing, communication, and inputs through the control panel 940. The scanner controller 931 or the printer controller 932 performs image processing such as error diffusion and gamma conversion.

A user may sequentially switch a document box function, a copier function, a printer function, and a facsimile function of the MFP 10 one to another with an application switch key on the control panel 940 to select one of these functions of the MFP 10. When the document box function is selected, the MFP 10 enters a document box mode. When the copier function is selected, the MFP 10 enters a copier mode. When the printer function is selected, the MFP 10 enters a printer mode. When the facsimile mode is selected, the MFP 10 enters a facsimile mode.

The network I/F 950 is an interface that enables data communication through the network N1. The short-range communication circuit 920 and the network I/F 950 are electrically connected to the ASIC 906 via the PCI bus 922.

A description is given below of the hardware configurations of the server 20 and the data server 30. Specifically, a description is given below of the hardware configuration of the server 20. The server 20 and the data server 30 have substantially the same hardware configurations.

Figure 3:
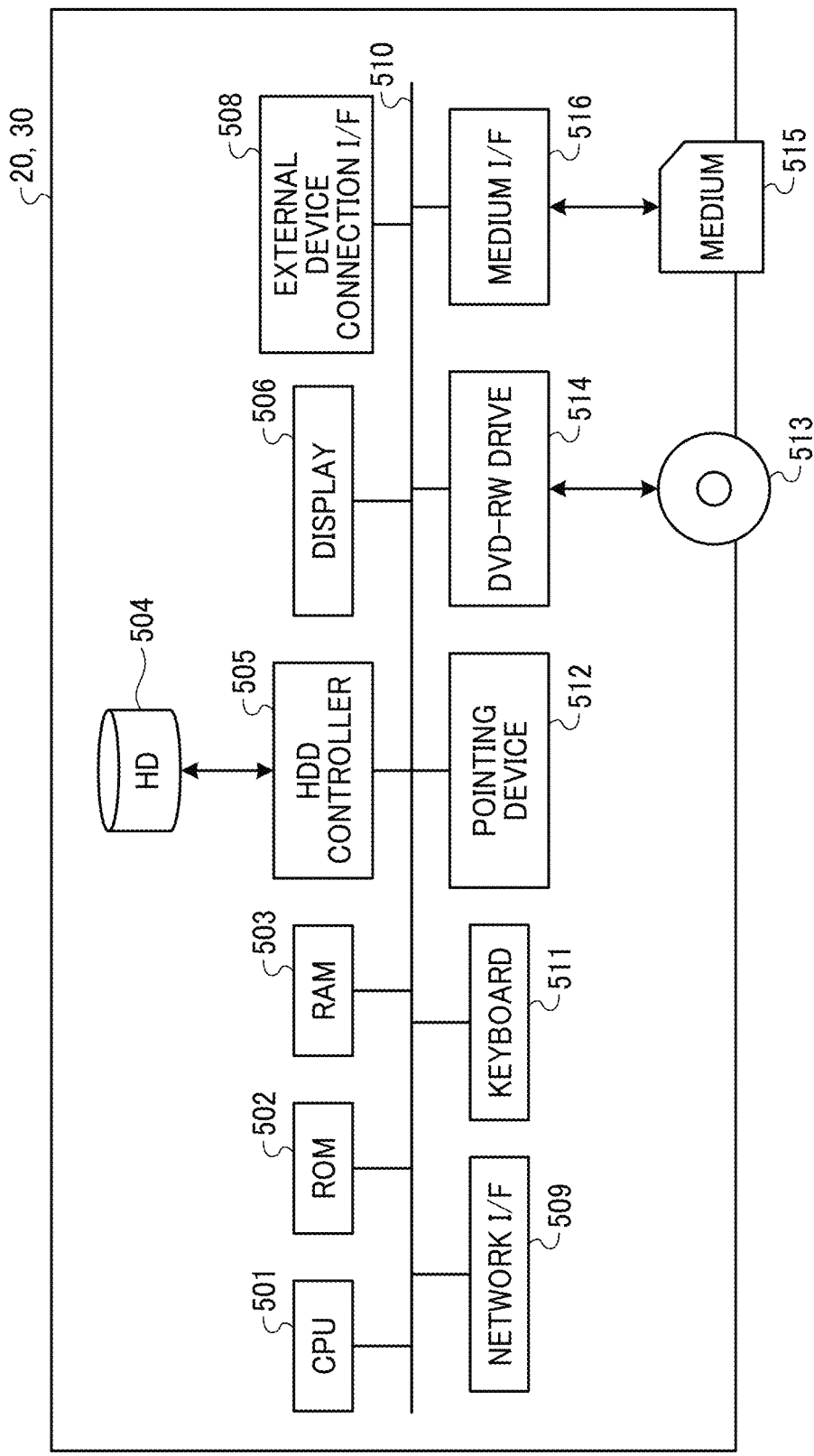
FIG. 3 is a block diagram illustrating a hardware configuration of a server according to an embodiment of the present disclosure.

FIG. 3 is a block diagram illustrating a hardware configuration of the server 20 according to the present embodiment.

As illustrated in FIG. 3, the server 20 is implemented by a computer. The server 20 includes a CPU 501, a ROM 502, a RAM 503, an HD 504, an HDD controller 505, a display 506, an external device connection 1/F 508, a network I/F 509, a bus line 510, a keyboard 511, a pointing device 512, a digital versatile disc rewritable (DVD-RW) drive 514, and a medium I/F 516.

The CPU 501 controls the entire operation of the server 20. The ROM 502 stores programs such as an initial program loader (IPL) to boot the CPU 501. The RAM 503 is used as a work area for the CPU 501. The HD 504 stores various data such as a program. The HDD controller 505 controls the reading and writing of various data from and to the HD 504 under the control of the CPU 501. The display 506 displays various kinds of information such as a cursor, a menu, a window, characters, or an image. The external device connection I/F 508 is an interface that connects the computer to various extraneous sources. Examples of the external devices include, but are not limited to, a universal serial bus (USB) memory and a printer. The network I/F 509 is an interface that enables data communication through the network N1 and the network N2. The bus line 510 is, for example, an address bus or a data bus, which electrically connects the components such as the CPU 501 illustrated in FIG. 3.

According to the present embodiment, the keyboard 511 serves as an input device provided with a plurality of keys for allowing a user to enter, for example, characters, numerical values, or various instructions. The pointing device 512 serves as an input device that allows a user to, for example, select or execute a specific instruction, select a target for processing, or move a cursor being displayed. The DVD-RW drive 514 controls the reading and writing of various data from and to a DVD-RW 513, which serves as a removable recording medium according to the present embodiment. The removable recording medium is not limited to the DVD-RW. For example, the removable recording medium may be a DVD-recordable (DVD-R). The medium O/F 516 controls the reading and writing (storing) of data from and to a recording medium 515 such as a flash memory.

Programs that are executed by the server 20 and the data server 30 of the present embodiment are stored in a computer-readable recording medium in an installable or executable file format and provided. Examples of the computer-readable recording medium include, but are not limited to, a CD-ROM, a flexible disk (FD), a CD-R, and a DVD.

Alternatively, the programs that are executed by the server 20 and the data server 30 of the present embodiment may be stored on a computer connected to a network such as the Internet so that the programs can be downloaded through the network and provided. Alternatively, the programs that are executed by the server 20 and the data server 30 of the present embodiment may be provided or distributed through a network such as the Internet.

A description is given below of a comparative example for preventing falsification.

In the comparative example, application information provided by a requester of document data and unique information are converted into a two-dimensional code and printed on a document to prevent falsification by the requester of the document data.

Figure 4A:
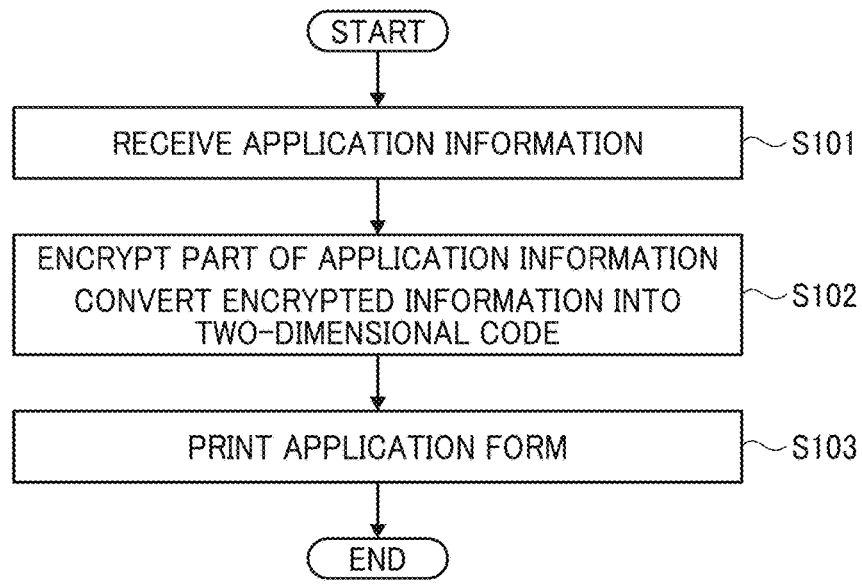
FIG. 4A is a flowchart of a procedure for printing an application form, according to a comparative example.
Figure 4B:
FIG. 4B is a diagram illustrating an outcome according to the comparative example of FIG. 4A.

FIGS. 4A and 4B illustrate the comparative example.

Specifically, FIG. 4A is a flowchart of a procedure for printing an application form according to the comparative example. FIG. 4B is a diagram illustrating an outcome according to the comparative example.

In the comparative example illustrated in FIGS. 4A and 4B, a part of application information is encrypted and converted into a two-dimensional code at an input terminal to generate an image combining document data and unique information, to prevent falsification by an operator at the time of application.

More specifically, as illustrated in FIG. 4A, in step S101, the input terminal receives application information, such as information stored in a resident card, input by an operator at the time of application. In step S102, the input terminal encrypts a part of the input application information and converts the encrypted information into a two-dimensional code together with unique information for uniquely identifying the document to be printed, such as pint date and time. In step S103, the input terminal prints, with a printer, an application form including the two-dimensional code.

As illustrated in the outcome illustrated in FIG. 4B, a two-dimensional code 51 including the application information and the unique information is printed on an application form 50.

FIG. 5 is a diagram illustrating an unfavorable situation that occurs in the comparative example.

Referring to FIG. 5, a description is given below of an unfavorable situation in which a document generated in the comparative example is forged. In this situation, the application form 50 that is output by an MFP may be forged. An example of forging methods is copying the application form 50. In this case, since the two-dimensional code 51 is also copied, an authenticity determiner may fail to distinguish between the application form 50 and a copy of the application form 50. A "copy" character or anti-copying paper may be used as anti-copying measures. However, these measures may be easily broken at the time of forgery by, for example, changing the density at the time of copying or purchasing paper. Since the document can be easily forged, the originality of the document is hardly maintained.

To address forgery and enhance the authenticity of a document, the two-dimensional code is used as a latent image in the information processing system 100 according to the present embodiment.

A description is given below of features of the information processing system 100 according to the present embodiment.

Figure 6:
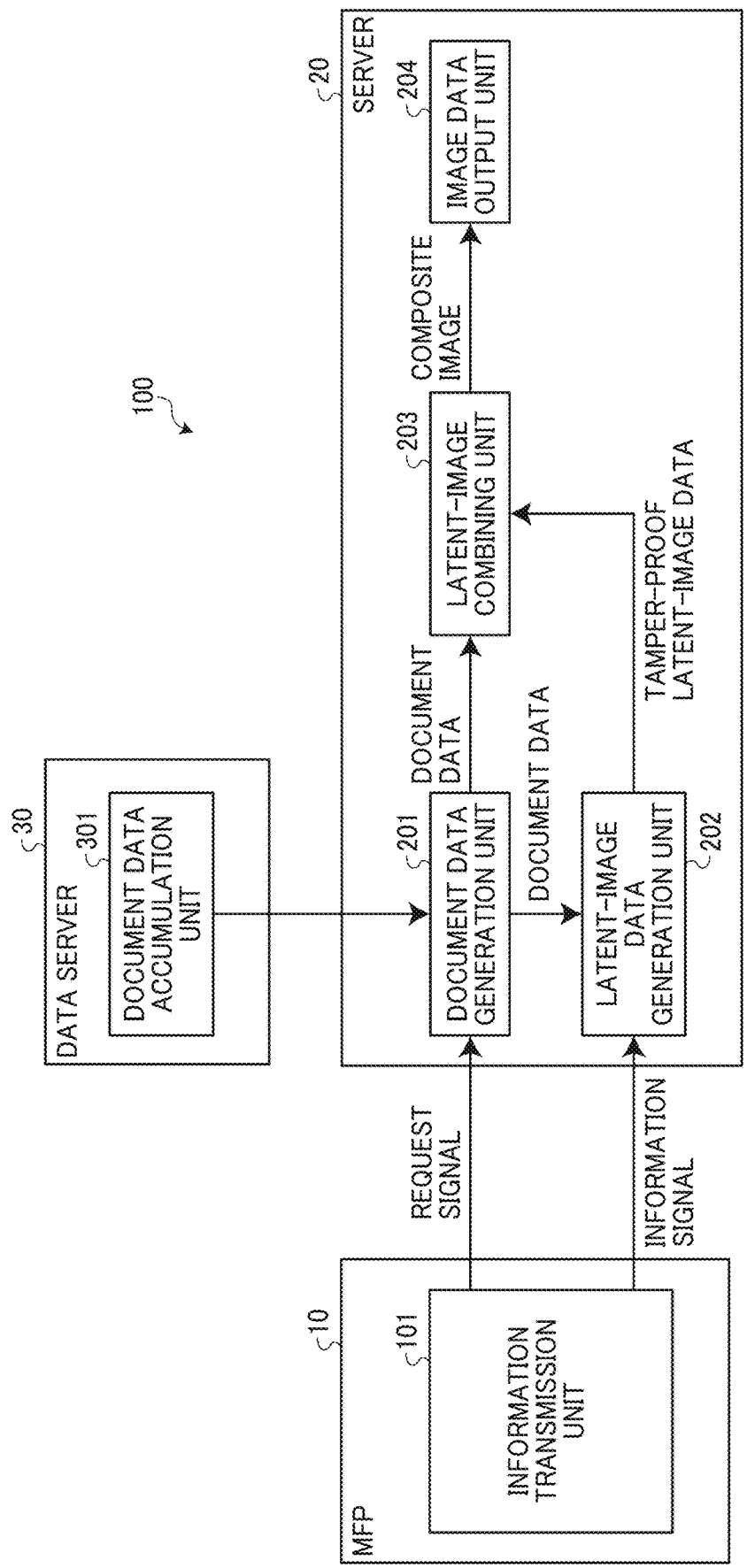
FIG. 6 is a block diagram illustrating a functional configuration of an information processing system according to an embodiment of the present disclosure.

FIG. 6 is a block diagram illustrating a functional configuration of the information processing system 100 according to the present embodiment.

As illustrated in FIG. 6, the MFP 10 of the information processing system 100 includes an information transmission unit 101 that is implemented by the CPU 901 reading and executing a program from the RAM 902b.

In response to a document request through an operation on the control panel 940 of the MFP 10, the information transmission unit 101 transmits a request signal and an information signal to a document data generation unit 201 and a latent-image data generation unit 202, respectively, of the server 20 described later. The request signal is a signal for requesting the output of document data. The information signal indicates information that is not described in the document. Examples of the information that is not described in the document and is indicated by the information signal retained by the MFP 10, which serves as an information processing terminal, include, but are not limited to, information on the time for generating tamper-proof latent-image data, information on the store at which the document is to be issued, a lot number as a unique number owned by the MFP 10, and a password set by a user who requests for output of document. A detailed description of the tamper-proof latent-image data is deferred.

The data server 30 of the information processing system 100 includes a document data accumulation unit 301 that is implemented by the CPU 501 reading and executing a program from the ROM 502 or the HD 504.

The document data accumulation unit 301 accumulates document data in the HD 504 serving as a storing unit. The document data accumulation unit 301 transmits the document data accumulated in the HD 504 to the document data generation unit 201 of the server 20, which will be described later. Since the server 20 thus acquires the document data from the document data accumulation unit 301 of the data server 30, the MFP 10 can cooperate with other systems. Thus, an increased number of patterns of image data can be generated.

The server 20 of the information processing system 100 includes the document data generation unit 201, the latent-image data generation unit 202, a latent-image combining unit 203, and an image data output unit 204, which are implemented by the CPU 501 reading and executing a program from the ROM 502 or the HD 504.

In response to the request signal transmitted from the information transmission unit 101 of the MFP 10, the document data generation unit 201 acquires document data from the document data accumulation unit 301 of the data server 30. Then, the document data generation unit 201 transmits the document data to the latent-image data generation unit 202 and the latent-image combining unit 203.

Based on the information signal transmitted from the information transmission unit 101 of the MFP 10 and indicating information that is not described in the document, the latent-image data generation unit 202 generates tamper-proof latent-image data such as a two-dimensional code as a latent image including an information signal and document data. The tamper-proof latent-image data as latent-image data is not limited to the two-dimensional code.

The latent-image combining unit 203 is an image combining unit that combines the document data transmitted from the document data generation unit 201 with the tamper-proof latent-image data generated by the latent-image data generation unit 202 as a latent image, to generate a composite image. The tamper-proof latent-image data is data of an image formed with, for example, toner or ink that can be read under invisible light such as infrared light or ultraviolet light.

The image data output unit 204 outputs the tamper-proof latent-image data and the document data. In the present embodiment, the image data output unit 204 outputs the composite image generated by the latent-image combining unit 203.

FIG. 7 is a diagram illustrating a composite image generated by the latent-image combining unit 203 according to the present embodiment.

As illustrated in FIG. 7, the latent-image combining unit 203 embeds, as a latent image, the tamper-proof latent-image data into the document data transmitted from the document data generation unit 201. The tamper-proof latent-image data is generated based on the information that is described in the document and indicated by the document data transmitted from the document data generation unit 201 and the information that is not described in the document and is indicated by the information signal transmitted from the MFP 10. The latent-image combining unit 203 thus generates a composite image and outputs the composite image to enhance the aggregation of information.

As described above, examples of the information that is not described in the document and is indicated by the information signal retained by the MFP 10, which serves as an information processing terminal, include, but are not limited to, information on the time for generating the tamper-proof latent-image data, information on the store at which the document is to be issued, a lot number as a unique number owned by the MFP 10, and a password set by a user who requests for output of document. Writing such information that is not known by a third party makes forgery difficult and thus prevents forgery. A third party may search logs of the MFP 10 to confirm the information signal transmitted from the MFP 10. However, some systems may be needed to search the logs of the MFP 10. When the information signal transmitted from the MFP 10 indicates a password set by a user, the user can confirm the authenticity.

Figure 8:
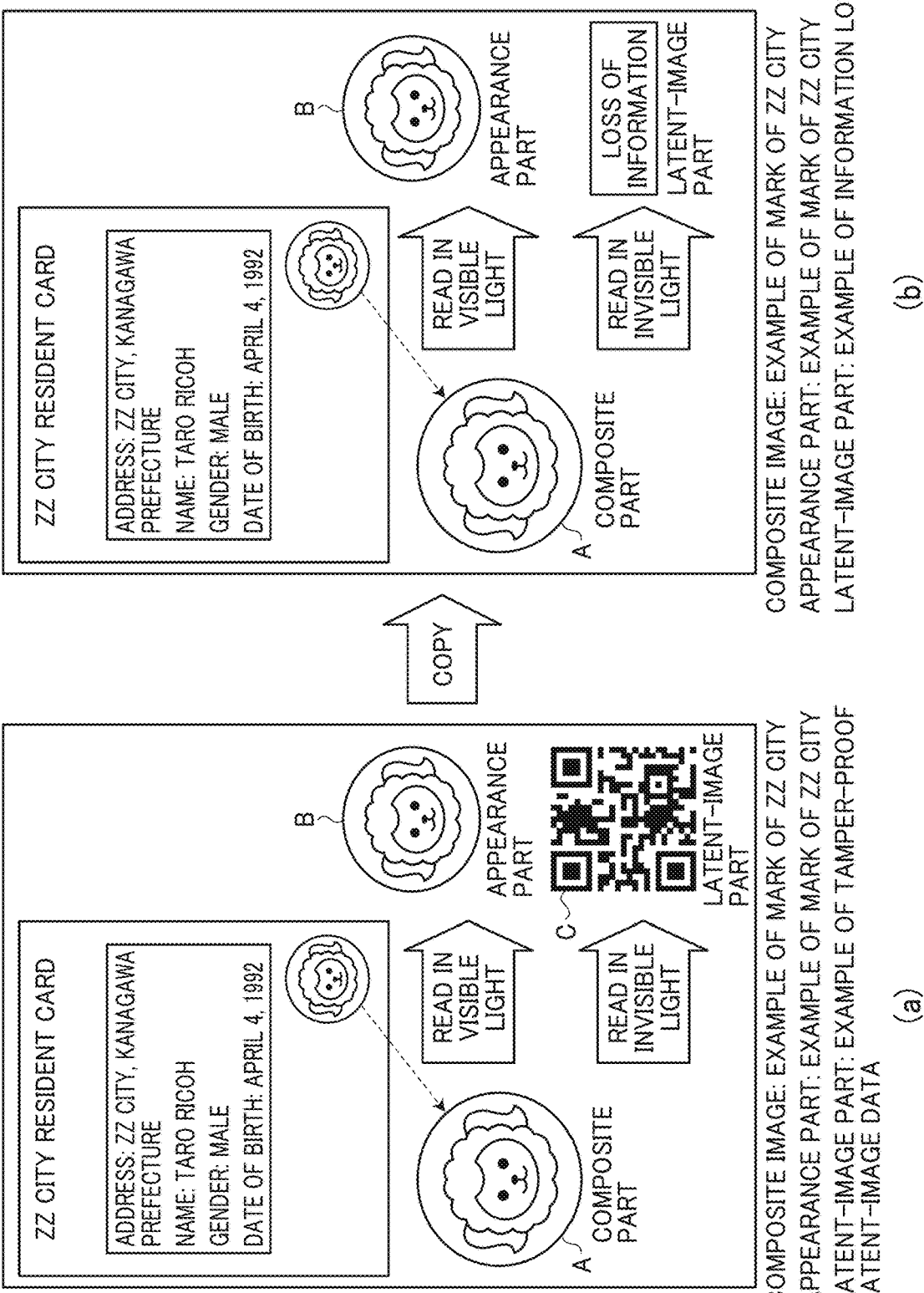
FIG. 8 is a diagram illustrating the composite image generated by the latent-image combining unit of FIG. 7 and a copy of the composite image.

FIG. 8 is a diagram illustrating a composite image generated by the latent-image combining unit 203 and a copy of the composite image, according to the present embodiment.

Specifically, FIG. 8(*a*) illustrates the composite image generated by the latent-image combining unit 203. FIG. 8(*b*) illustrates the copy of the composite image.

In the present embodiment, a composite part A of the composite image includes an appearance part B and a latent-image part C. The appearance part B indicates the document data transmitted from the document data generation unit 201. The latent-image part C indicates the tamper-proof latent-image data. The latent-image part C is an image that is formed to be readable under invisible light such as infrared light or ultraviolet light at the time of copying.

Thus, the composite part A of the composite image generated by the latent-image combining unit 203 can be read as different information when the frequency characteristics of light are changed at the time of reading. Specifically, as illustrated in FIG. 8(*a*), the composite part A of the composite image includes two pieces of information in the appearance part B indicating the document data transmitted from the document data generation unit 201 and the latent-image part C indicating the tamper-proof latent-image data. Thus, the information aggregation of the document is enhanced.

When the composite part A of the composite image is copied with typical visible light, the latent-image part C is unreadable as illustrated in FIG. 8(*b*) because the latent-image part C is readable under infrared light or ultraviolet light. In other words, the information of the latent-image part C disappears. In short, when the composite part A of the composite image is read by visible light, the tamper-proof latent-image data of the latent-image part C disappears from the copy of the composite image. Thus, the authenticity of the document is enhanced.

In a case where the latent-image part C is readable under infrared light, improvement of typical scanners may allow the latent-image part C to be read. An effect of reading by the infrared light is enhancing the versatility of reading devices.

In a case where the latent-image part C is readable under ultraviolet light, the latent-image part C can be read simply by being irradiated with black light. An effect of reading by the ultraviolet light is facilitating confirmation.

FIG. 9 is a diagram illustrating an effect that an image output from the image data output unit 204 is not forged, according to the present embodiment.

As illustrated in FIG. 9, for example, the image that is output from the image data output unit 204 is output as a document from a given MFP 10. A forger X fails to create the same document when copying the document output from the MFP 10 with another MFP. This is because the tamper-proof latent-image data is not copied when the document is copied with another MFP. Even if the forger X has a latent-image generation technique for generating an image as a latent image and tries to forge the document by the latent-image generation technique, the forger X fails to forge the document because the inherent information that is not included in the information described in the document and indicated by document data (i.e., the information that is not described in the document) is convened into a two-dimensional code and thus the document incorporates information other than the information described in the document. In short, the forger X does not know what the information signal indicates and fails to forge the document. Thus, the present embodiment prevents forgery and enhances the authenticity of documents.

According to the present embodiment, an authenticity determiner as a reader of composite images can be limited to a specific person or institution having a dedicated special reading device.

A description is given below of a flow of an image data output process in the server 20 as described above.

FIG. 10 is a flowchart of an image data output process in the server 20 according to the present embodiment.

As illustrated in FIG. 10, in step S1, the document data generation unit 201 transmits document data to the latent-image data generation unit 202 and the latent-image combining unit 203 in response to a request signal transmitted from the MFP 10.

In step S2, based on an information signal transmitted from the MFP 10 and indicating information that is not included in a document indicated by the document data, the latent-image data generation unit 202 generates tamper-proof latent-image data such as a two-dimensional code as a latent image including the information signal and the document data.

In step S3, the latent-image combining unit 203 combines the document data transmitted from the document data generation unit 201 with the tamper-proof latent-image data generated by the latent-image data generation unit 202 as a latent image, to generate a composite image.

Finally, in step S4, the image data output unit 204 outputs the composite image generated by the latent-image combining unit 203. The composite image may be transmitted to the MFP 10 for printing.

As described above, according to the present embodiment, documents are prevented from being copied or forged and the authenticity of the documents is enhanced. More specifically, forgery by copying is prevented by outputting a document image and a latent image (tamper-proof latent-image data) and using the latent image for security purposes. Thus, the degree of security is increased. In addition, embedding the information that is not included in the document prevents a person having a latent-image printing technique from forging the document even if the person has a technique for generating a latent image. This is because the document incorporates information other than the information described in the document and the person does not know what the information signal indicates. Thus, the authenticity is enhanced.

In the embodiment described above, an MFP having at least two of copying, printing, scanning, and facsimile functions has been described as the information processing terminal. Alternatively, the information processing terminal may be an image forming apparatus such as a copier, a printer, a scanner, or a facsimile machine.

The information processing terminal is not limited to an image forming apparatus provided that the information processing terminal is an apparatus having a communication function.

Examples of the information processing terminal include, but are not limited to, output devices such as a projector (PJ), an interactive whiteboard (IWB; an electronic whiteboard that can perform mutual communication and has a blackboard function), and digital signage, a head-up display (HUD), an industrial machine, an imaging device, a sound collecting device, a medical device, a networked home appliance, an automobile (connected car), a laptop computer or laptop personal computer (PC), a mobile phone, a smartphone, a tablet terminal, a game console, a personal digital assistant (PDA), a digital camera, a wearable computer or wearable PC, and a desktop computer or desktop PC.

Although the prevention of document falsification has been described in the present embodiment, the field to which the embodiments of the present disclosure are applied is not limited to the field described above. For example, the field may be a field in which useful effects are obtained by forming a two-dimensional code as a latent image, such as a field of data protection (for example, protection of personal information or privacy protection).

According to one aspect of the present disclosure, documents are prevented from being copied or forged and the authenticity of the documents is enhanced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus, comprising:
a processor configured to:
receive document data from a data server in response to a request signal transmitted from an information processing terminal, the request signal requesting output of the document data;
receive, based on an information signal transmitted from the information processing terminal, the information signal indicating information that is not described in a document indicated by the document data;
generate tamper-proof latent-image data which includes both the document data and the information signal;
create a composite image by combining the document data which is in a human readable form with tamper-proof latent-image data that is invisible or hardly visible to a human; and
output the composite image which was created.

2. The information processing apparatus according to claim 1, wherein:
the processor is configured to generate the latent-image data for generating the latent-image readable by infrared light.

3. The information processing apparatus according to claim 1, wherein:
the processor is configured to generate the latent-image data readable by ultraviolet light.

4. An information processing system comprising:
the information processing terminal; and
the information processing apparatus according to claim 1, communicably connected with the information processing terminal.

5. The information processing apparatus according to claim 1, wherein:
the processor is configured to generate the latent-image data for generating the latent image as a two-dimensional code.

6. A method performed by a processor for processing information, comprising:
receiving document data from a data server in response to a request signal transmitted from an information processing terminal, the request signal requesting output of the document data;
receiving, based on an information signal transmitted from the information processing terminal, the information signal indicating information that is not described in a document indicated by the document data;
generating tamper-proof latent-image data which includes both the document data and the information signal;
creating a composite image by combining the document data which is in a human readable form with tamper-proof latent-image data that is invisible or hardly visible to a human; and
outputting the composite image which was created.

7. The method according to claim 6, wherein:
the generating the latent-image data generates the latent-image data which includes a two-dimensional code.

* * * * *